US011230220B2

(12) United States Patent
Knox

(10) Patent No.: US 11,230,220 B2
(45) Date of Patent: Jan. 25, 2022

(54) SLIDING FLAT HOOK STRAP ANCHOR FOR FLATBED CARGO SECUREMENT STRAPS

(71) Applicant: Ancra International LLC, Azusa, CA (US)

(72) Inventor: Howard T. Knox, Cold Spring, KY (US)

(73) Assignee: Ancra International LLC, Azusa, CA (US)

( * ) Notice: Subject to any disclaimer, the term of this patent is extended or adjusted under 35 U.S.C. 154(b) by 200 days.

(21) Appl. No.: 16/741,982

(22) Filed: Jan. 14, 2020

(65) Prior Publication Data

US 2020/0247306 A1 Aug. 6, 2020

Related U.S. Application Data

(60) Provisional application No. 62/801,499, filed on Feb. 5, 2019.

(51) Int. Cl.
*B60P 7/08* (2006.01)

(52) U.S. Cl.
CPC ........... *B60P 7/0869* (2013.01); *B60P 7/0861* (2013.01)

(58) Field of Classification Search
CPC ....... B60P 7/0823; B60P 7/0876; B60P 7/083; B60P 7/0815; B60P 7/0853; B60P 7/0807; B60P 7/135
USPC ....... 410/96, 100, 97, 101, 103, 156, 85, 89, 410/80; 24/713.6, 163 R, 20 R, 21, 303, 24/68 CD, 713.8, 713.7, 69 TT
See application file for complete search history.

(56) References Cited

U.S. PATENT DOCUMENTS

| 5,388,938 | A | * | 2/1995 | Helton | ..................... B60P 7/08 24/68 CD |
| 6,626,621 | B1 | | 9/2003 | Hugg | |
| 6,939,095 | B1 | | 9/2005 | Hugg | |
| 7,160,069 | B2 | * | 1/2007 | Adams | .................. B60P 7/0807 410/104 |
| 7,458,758 | B2 | | 12/2008 | Adams | |
| 8,459,912 | B2 | * | 6/2013 | Siegenthaler | ......... B60P 7/0823 410/97 |
| 8,511,951 | B2 | * | 8/2013 | Yacucha | ............... B60P 7/0807 410/106 |

(Continued)

OTHER PUBLICATIONS

Glide Lock Sliding Load Securement Bracket Brochure, 1 page, undated.

*Primary Examiner* — D Glenn Dayoan
*Assistant Examiner* — Sunsurraye Westbrook
(74) *Attorney, Agent, or Firm* — Crowell & Moring LLP

(57) ABSTRACT

An anchor device for a cargo securement strap includes a frame configured to engage a mounting track. The anchor device further includes a hook receiver coupled to the frame. The hook receiver is configured to receive a hook of the cargo securement strap. The anchor device further includes a keeper coupled to the frame. The keeper includes a keeper body and at least one keeper finger extending from a side of the keeper body. The keeper is configured to move between a first position and a second position. In the first position, the at least one keeper finger contacts a bolt and the keeper body is positioned to retain the hook. In the second position, the keeper body is positioned to allow for removal of the hook from the hook receiver.

26 Claims, 6 Drawing Sheets

(56) References Cited

U.S. PATENT DOCUMENTS

| | | | |
|---|---|---|---|
| 8,807,893 B2* | 8/2014 | Adams | B60P 7/0823 410/97 |
| 9,061,622 B2 | 6/2015 | Knox | |
| 9,764,677 B2 | 9/2017 | Murillo et al. | |
| 9,950,656 B2 | 4/2018 | Murillo et al. | |

* cited by examiner

SLIDING FLAT HOOK STRAP ANCHOR FOR FLATBED CARGO SECUREMENT STRAPS

CROSS-REFERENCE TO RELATED APPLICATIONS

This application claims priority from U.S. Provisional Application No. 62/801,499, filed Feb. 5, 2019, the entirety of which is hereby fully incorporated by reference herein.

TECHNICAL FIELD

This disclosure relates to the field cargo securement and, in particular, to an anchor system for a cargo securement strap.

BRIEF SUMMARY

A first representative embodiment of the disclosure is provided. In this embodiment, a releasable anchor system for securing cargo may be provided that includes a frame including a top portion, a first side, and a second side, the first and the second side extending from opposite sides of the top portion. The system further includes a hook receiver coupled to the frame between the first side and the second side. The hook receiver is configured to receive a hook of a cargo securement strap. The system further includes a keeper configured to retain the hook when received upon the hook receiver. The keeper includes a keeper body, a first keeper finger, and a second keeper finger. The first and second keeper fingers extend from opposite sides of the keeper body, and the first and second keeper fingers are rotatably coupled to the first and second side, respectively. The system further includes a stopper bolt coupled between the first side and the second side. The stopper bolt is positioned to contact the first and second keeper fingers in a first position.

In another embodiment, an anchor device for a cargo securement strap is provided that includes a frame configured to engage a mounting track. The anchor device further includes a hook receiver coupled to the frame. The hook receiver is configured to receive a hook of the cargo securement strap. The anchor device further includes a keeper coupled to the frame. The keeper includes a keeper body and at least one keeper finger extending from a side of the keeper body. The keeper is configured to move between a first position and a second position. In the first position, the at least one keeper finger contacts a bolt, and the keeper body is positioned to retain the hook. In the second position, the keeper body is positioned to allow for removal of the hook from the hook receiver.

In yet another embodiment, a method of use for an anchor device of a cargo securement strap is provided. The anchor device is attached to a mounting track of a vehicle. The anchor device includes a frame configured to engage the mounting track. The anchor devices further includes a hook receiver coupled to the frame. The hook receiver is configured to receive a hook of the cargo securement strap. The anchor device further includes a keeper pivotably coupled to the frame. The keeper includes a keeper body and two keeper fingers extending from opposite sides of the keeper body. The keeper is configured to pivot between a first position and a second position. In the first position, the two keeper fingers contact a bolt and the keeper body is positioned to retain the hook. In the second position, the keeper body contacts the bolt, and the keeper is positioned to allow a release of the hook from the hook receiver by pulling the hook downwardly from the hook receiver to free an extended end of the hook from the hook receiver. A handle of the keeper body is pulled causing the keeper to rotate from the first position to the second position. The hook of the cargo securement strap is engaged with the hook receiver. The handle is released causing the keeper to rotate from the second position to the first position due to a force of gravity acting upon the keeper body.

Advantages of the disclosed devices will become more apparent to those skilled in the art from the following description of embodiments that have been shown and described by way of illustration. As will be realized, other and different embodiments are contemplated, and the disclosed details are capable of modification in various respects. Accordingly, the drawings and description are to be regarded as illustrative in nature and not as restrictive.

BRIEF DESCRIPTION OF THE DRAWINGS

The embodiments may be better understood with reference to the following drawings and description. The components in the figures are not necessarily to scale. Moreover, in the figures, like-referenced numerals designate corresponding parts throughout the different views.

DETAILED DESCRIPTION OF THE DRAWINGS AND THE PRESENTLY PREFERRED EMBODIMENTS

Figure 1:
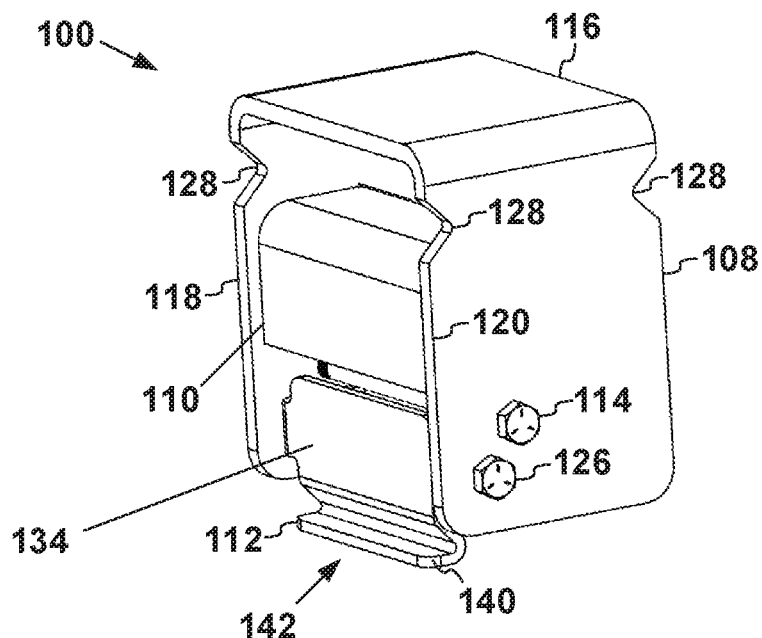
FIG. 1 illustrates a perspective view of an embodiment of an anchor device for a cargo securement strap in a first position.
Figure 2:
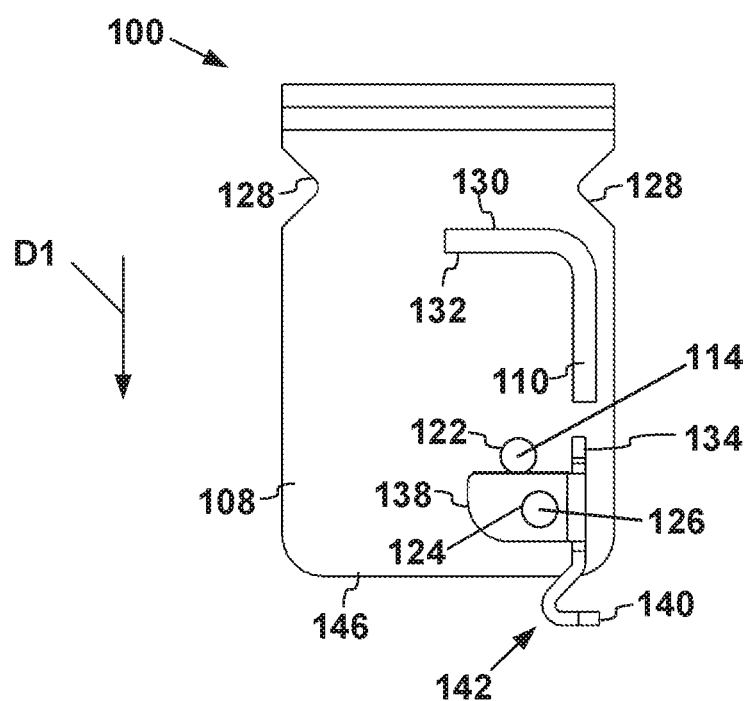
FIG. 2 illustrates a cross-sectional view of the anchor device of FIG. 2.
Figure 3:
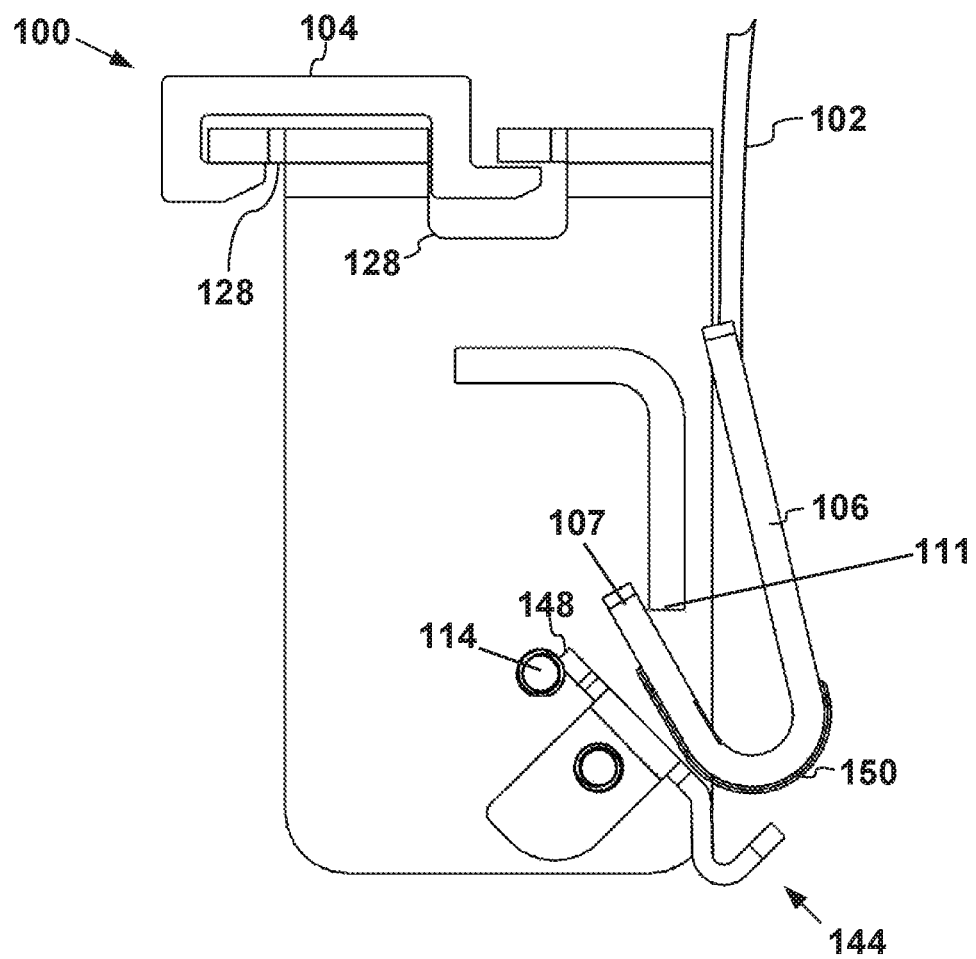
FIG. 3 illustrates a cross-sectional view of the anchor device of FIG. 2 in a second position and supported by a mounting track.
Figure 4:
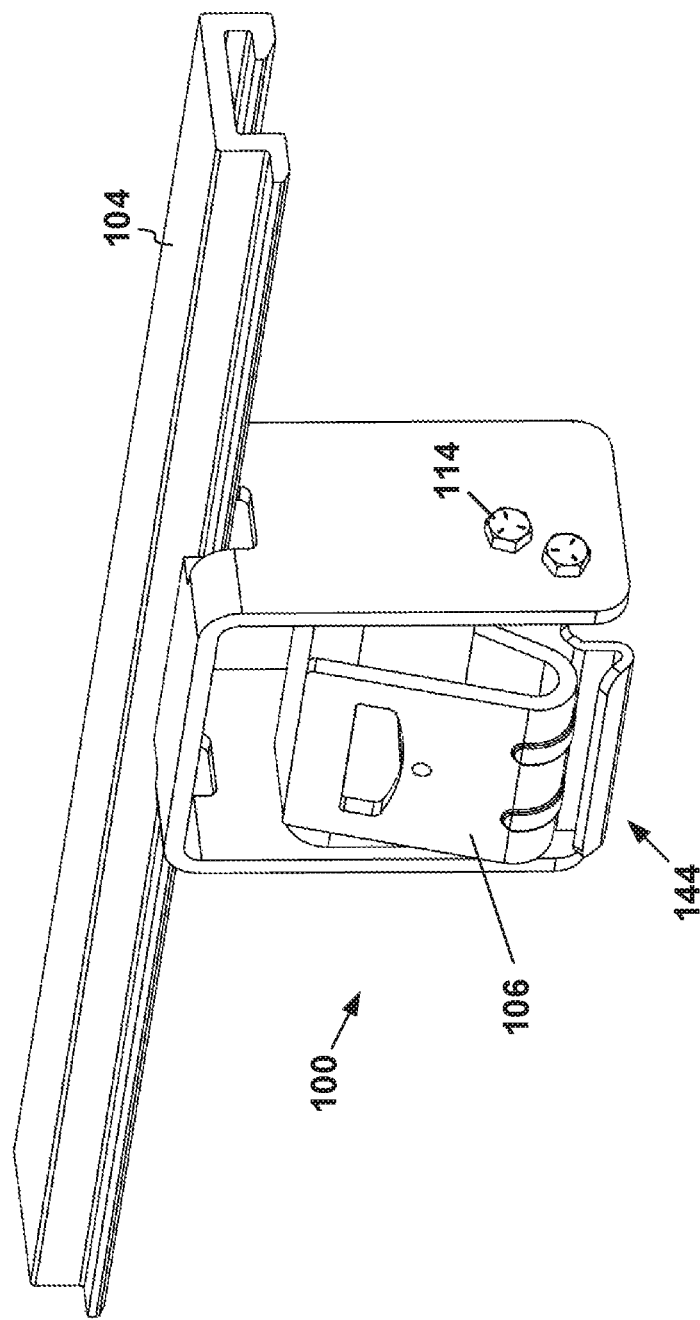
FIG. 4 illustrates a perspective view of the anchor device of FIG. 3.
Figure 8:
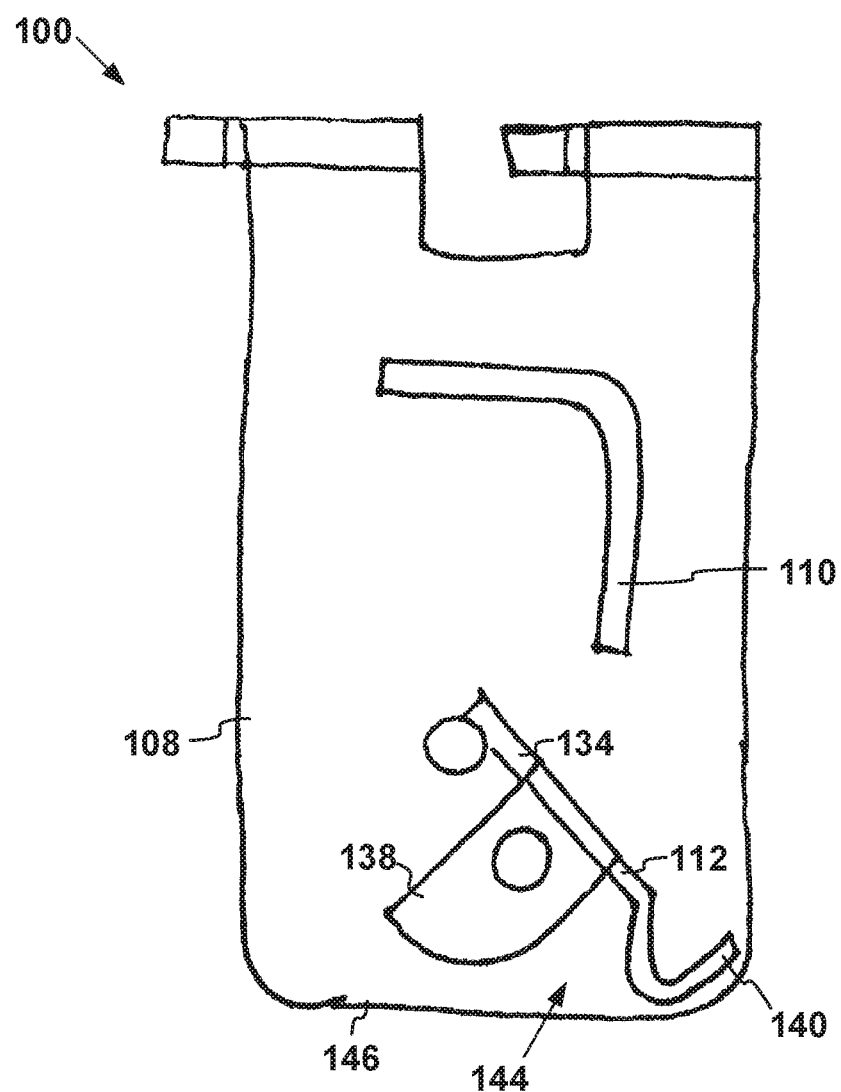
FIG. 8 illustrates a cross-sectional view of another embodiment of the anchor device.

FIGS. 1-4 and 8 illustrate different views of a first embodiment of a releasable anchor device 100 for a cargo securement strap 102. FIG. 1 illustrates a perspective view of an embodiment of the anchor device 100. FIG. 2 illustrates a cross-sectional view of the anchor device 100. FIG. 3 illustrates another cross-sectional view of the anchor device 100. FIG. 4 illustrates another perspective view of the anchor device 100. FIG. 8 illustrates yet another cross-sectional view of the anchor device 100. The anchor device 100 may be any device positionable on a mounting track 104 and configured to receive a hook 106 of the cargo securement strap 102. The anchor device 100 may include a frame 108, a hook receiver 110, a keeper 112, and a stopper bolt 114.

As shown in FIG. 1, the frame 108 may be any rigid structure that houses components of the anchor device 100. The frame 108 may include a top portion 116, a first side 118, and a second side 120. The first side 118 and the second side 120 may extend from opposite sides of the top portion 116. As shown in FIG. 2, the first side 118 and the second side 120 may include a first set of holes 122 and a second set of holes 124. The first set of holes 122 may be positioned to receive the stopper bolt 114. The second set of holes 124 may be positioned to receive multiple keeper coupling means 126. The frame 108 may include multiple slots 128 configured to engage the mounting track 104. As shown in FIGS. 1 and 2, the slots 128 may be shaped to slidably engage the mounting track 104 when the mounting track 104 is C-shaped. Alternatively, as shown in FIGS. 3 and 4, the slots 128 may be shaped to slidably engage the mounting track 104 when the mounting track 104 is Double-L shaped. In other embodiments, the anchor device 100 may be fixedly coupled to the mounting track 104. In the first embodiment, the top portion 116 may be integrally formed with the first side 118 and the second side 120. In other words, the frame 108 may be one continuous piece. In other embodiments, the top portion 116, the first side 118, and the second side 120, may be discrete pieces coupled together.

The hook receiver 110 may be any landing piece positionable in the frame 108 and configured to receive the hook 106 of the cargo securement strap 102. In the first embodiment, the hook receiver 110 may extend between the first side 118 of the frame 108 and the second side 120 of the frame 108. In one embodiment, the hook receiver 110 may be integral with the frame 108. In alternate embodiments, the hook receiver 110 may be coupled to the frame 108. As shown in FIGS. 1 and 2, the hook receiver 110 may be a single, curved piece. In the first embodiment, the hook receiver 110 may include a top side 130 and a bottom side 132.

Figure 7:
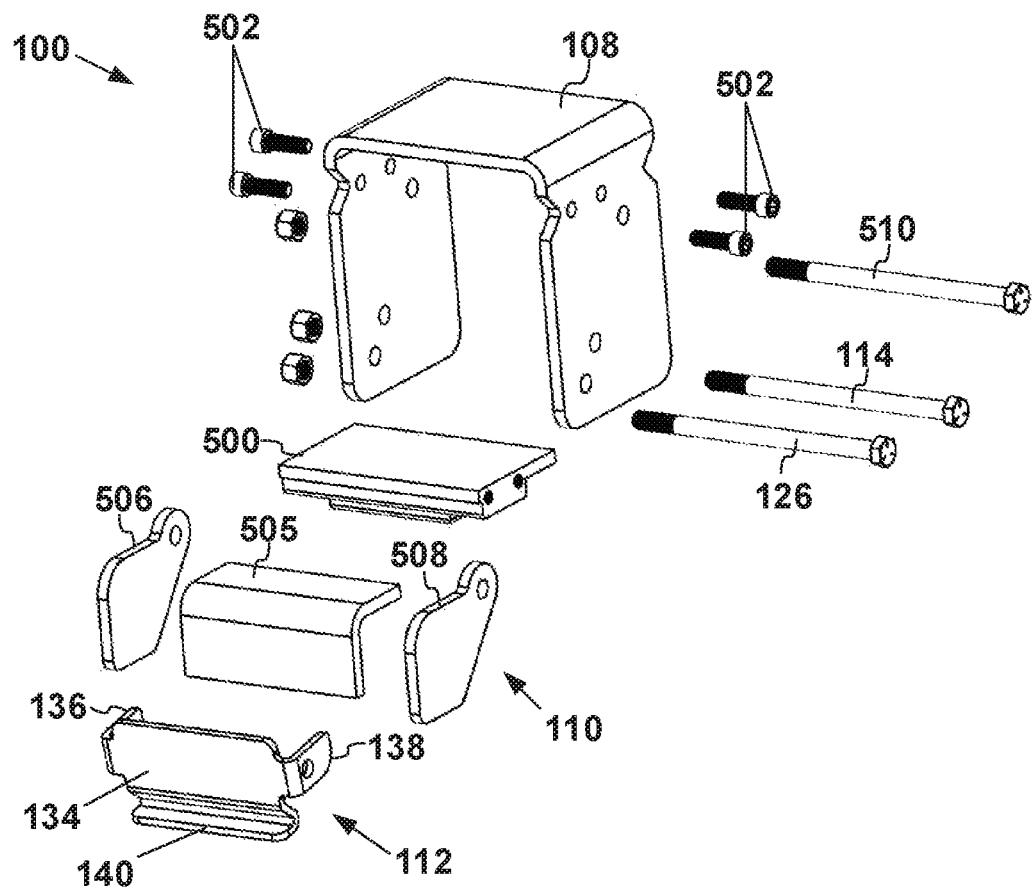
FIG. 7 illustrates an exploded view of the anchor device of FIG. 5.

The keeper 112 may be any piece configured to retain and release the hook 106 of the cargo securement strap 102. As shown in FIGS. 1-4, the keeper 112 may be positioned in the frame 108, extending between the first side 118 and the second side 120. The keeper 112 may be configured to move upon the frame 108. The moving of the keeper 112 upon the frame 108 may include, for example, rotating and/or sliding. The keeper 112 may include a keeper body 134, a first keeper finger 136, a second keeper finger 138, and a handle 140. The first keeper finger 136 is hidden from view in FIGS. 1-4 but is shown in FIG. 7. The first keeper finger 136 and the second keeper finger 138 may extend from opposite sides of the keeper body 134. In the first embodiment, the keeper coupling means 126 may be any bolt or fastener that couples the first keeper finger 136 to the first side 118 and the second keeper finger 138 to the second side 120, and the keeper 112 may be configured to rotate about the keeper coupling means 126. Alternatively or in addition, the frame 108 may include slots (not shown) that allow the keeper 112 to slide upon the frame 108. In some embodiments the keeper body 134, the first and second keeper fingers 136, 138, and the handle 140 may be integrally formed. In alternate embodiments, the keeper body 134, the first and second keeper fingers 136, 138, and the handle 140 may be discreet pieces coupled together. The keeper 112 may be rotatable and/or slidable between a first position 142, as shown in FIGS. 1-2, and a second position 144, as shown in FIGS. 3-4. In the first position 142, the keeper 112 is configured to retain the hook 106, and in the second position 144, the keeper 112 is configured to release the hook 106. In the first position 142, when the hook 106 is positioned on or adjacent the hook receiver 110, a top surface 148 of the keeper body 134 may face a bottom edge 150 of the hook 106 preventing removal of the hook 106, by eliminating the distance necessary for the hook 106 to be moved downwardly to allow the tongue 107 of the hook 106 to clear past the bottom edge 111 of the hook receiver 110. In the second position 144, the top surface 148 of the keeper body 134 may be rotated and/or slidably moved away from the bottom edge 150 of the hook 106 allowing removal of the hook 106, by establishing the open space necessary for the hook 106 to be moved downwardly to allow the tongue 107 of the hook 106 to clear past the bottom edge 111 of the hook receiver 110.

The stopper bolt 114 may be any stopper piece configured to limit a rotation and/or a sliding of the keeper 112. As shown in FIGS. 1-4, the stopper bolt 114 may be positioned above the first and second keeper fingers 136, 138. In the first embodiment, the stopper bolt 114 may be a single, elongated piece extending between the first side 118 and the second side 120 and through the first set of holes 122. The stopper bolt 114 may be coupled to the frame 108. In the first position 142, the first and second keeper fingers 136, 138 may contact the stopper bolt 114. As shown in FIG. 3, in the second position 144, the keeper body 134 may contact the stopper bolt 114, such that the stopper bolt 114 limits the range of potential travel of the first and second keeper fingers 136, 138 with respect to the frame 108 and the hook receiver 110. In alternate embodiments, in the first and second positions 142, 144 the keeper 112 may approach but never contact the stopper bolt 114. In embodiments depicted in the figures, the keeper 112 is connected to allow the keeper 112 to rotate with respect to the frame 108 between the first and second positions 142, 144. In these embodiments, the walls of the frame 108 may include corresponding the slots for sliding. In other embodiments, the keeper 112 may slide within the frame 108 instead of rotation, or in some embodiments, the keeper 112 may slide and rotate with respect to the frame 108.

As shown in FIGS. 1-4, the handle 140 may be positioned at a bottom end of the keeper 112. The handle 140 may extend beyond an outer edge 146 of the frame 108 in the first position 142 and/or the second position 144. The handle 140 may be configured to be grasped by a user to rotate the keeper 112 between the first position 142 and the second position 144. Alternatively or in addition, the handle 140 maybe configured to be grasped by the use to slide the keeper 112 along the frame 108. The handle 140 may be shaped to achieve a desired weight distribution of the keeper 112. The weight distribution of the keeper 112 may allow the keeper 112 to be urged into the first position 142 due to a force of gravity acting upon the keeper 112. The force of gravity may act in a direction D1, when the anchor device 100 is supported upon a mounting track 104 for normal use as depicted in FIGS. 3 and 4. In some embodiments, a spring or other biasing device may be provided to further urge the keeper 112 to the first position 142, but in some embodiments, the keeper 112 and frame 108 may be constructed such that the force of gravity alone urges the keeper 112 to the first position 142. The keeper 112 may remain in the first position 142 unless acted upon by an outside force, such as a user pulling the handle 140 outward. In some embodiments the keeper 112 is sized, shaped, and aligned upon the frame such that, when the keeper 112 is in the first position 142, a downward force upon the top surface 148 of the keeper 112, such as from the hook 106 (when positioned about the hook receiver 110) when the tension on the strap or chain connected with the hook 106 is relaxed, will not cause the keeper 112 to move to the second position 144. One of ordinary skill in the art after a thorough review and understanding of this specification and drawings will understand how to construct the keeper 112, frame 108, and other components of the anchor device 100 to achieve the functionality without undue experimentation.

In further embodiments, as shown in FIG. 8, the keeper body 134 may be entirely disposed within the frame 108. In this embodiment, when the keeper 112 is positioned in either the first position 142 (not shown in FIG. 8) or the second position 144, the handle 140 of the keeper 112 does not extend beyond the outer edge 146 of the frame 108. In some embodiments, the keeper 112 may be entirely disposed within the frame 108. In other embodiments, only the keeper body 134 and the first and second keeper fingers 136, 138 may be entirely disposed within the frame 108. In some embodiments, the keeper body 134 may be entirely disposed within the frame 108 only in the first position 142. In other embodiments, the keeper body 134 may be entirely disposed within the frame 108 only in the second position 144.

During operation, the user may attach the anchor device 100 to the mounting track 104 by slidably engaging the slots 128 of the anchor device 100 with the mounting track 104. Because the keeper 112 remains in the first position 142, the user may pull the handle 140 causing the keeper 112 to rotate and/or slide from the first position 142 to the second position 144. When the keeper 112 is rotated and/or slidably moved to the second position 144, the hook 106 of the cargo securement strap 102 may be added to the hook receiver 110. The user may release the handle 140 causing the keeper 112 to return to the first position 142. When the keeper 112 is in the first position 142, the hook 106 is retained by the keeper 112 whether or not a tension is applied to the cargo securement strap 102. If no tension is applied, the hook 106 will be urged by gravity into contact with the top surface 148 of the keeper body 134. The tension may be applied to the cargo securement strap 102 by a cranking device, such as a winch (not shown), that is positioned at an end of the cargo securement strap 102 opposite the hook 106. To remove the hook 106, once the tension is removed from the cargo securement strap 102, the handle 140 may be pulled causing the keeper body 134 to rotate and/or slide from the first position 142 to the second position 144. When the keeper body 134 is rotated and/or slidably moved to the second position 144, the hook 106 may be removed from the hook receiver 110.

Figure 5:
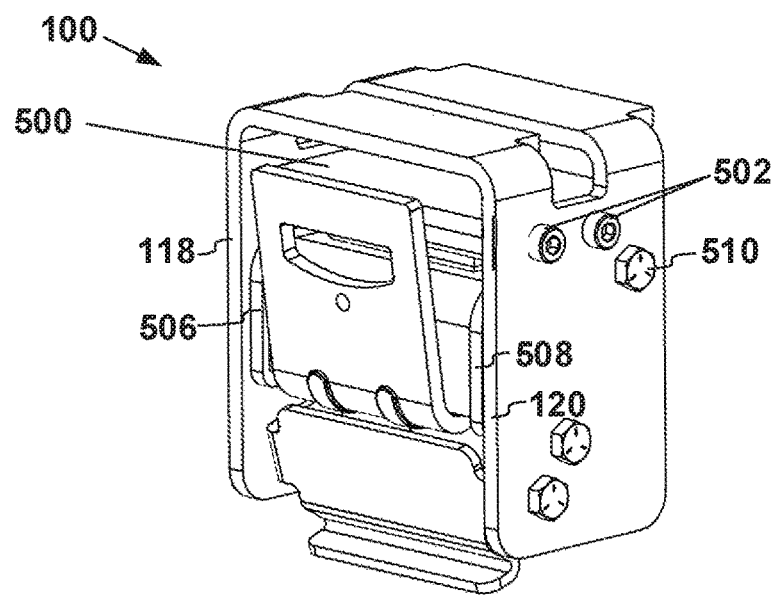
FIG. 5 illustrates a perspective view of another embodiment of the anchor device of FIG. 1.
Figure 6:
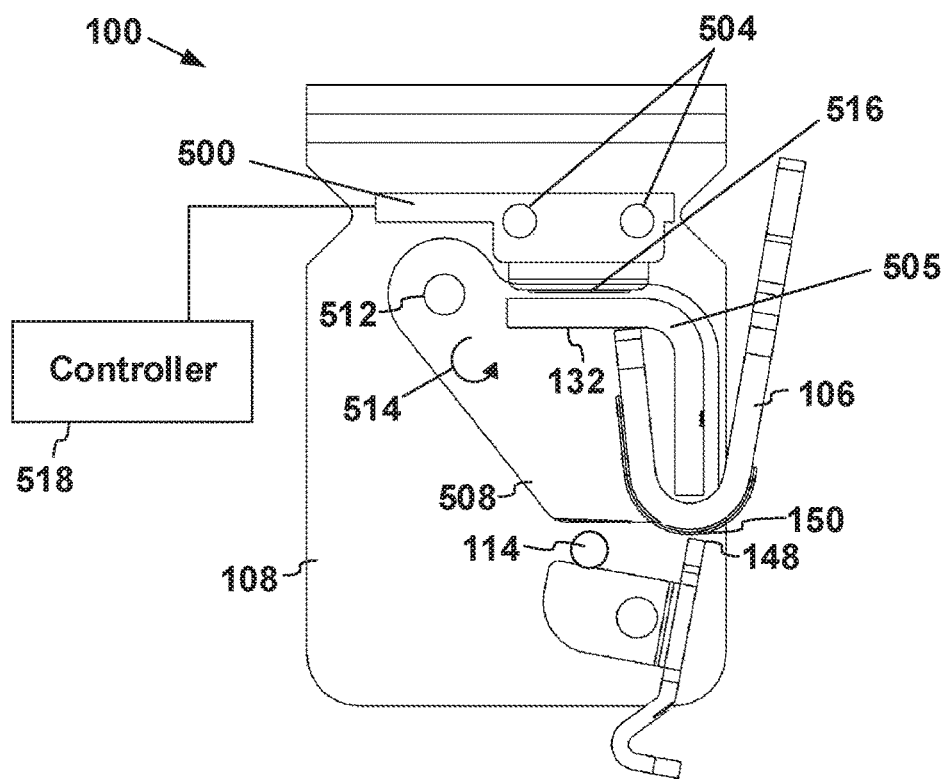
FIG. 6 illustrates a cross-sectional view of the anchor device of FIG. 5.

FIGS. 5, 6 and 7 illustrate a second embodiment of the anchor device 100 in which the anchor device 100 includes a tension sensor module 500. The tension sensor module 500 may be any device configured to detect an applied force. The tension sensor module 500 may be positioned in the frame 108. The tension sensor module 500 may extend between the first side 118 and the second side 120. The tension sensor module 500 may be coupled to the frame 108 by a module coupling means 502. The module coupling means 502 may extend through a third set of holes 504 in the frame 108.

In the second embodiment, as shown in FIG. 5, the hook receiver 110 may include a receiver body 505, a first receiver side 506, and a second receiver side 508 coupled to opposite sides of the receiver body 505. The first receiver side 506 may be positioned adjacent the first side 118 and the second receiver side 508 may be positioned adjacent the second side 120. The first receiver side 506 and the second receiver side 508 may be movably coupled, such as rotatably, slidably or based upon a combination of the two, to the frame 108 by a pivot pin 510. The pivot pin 510 may extend through a fourth set of holes 512 in the frame 108. The hook receiver 110 may be configured to rotate in a first direction 514 and/or slide along the frame 108 causing the hook receiver 110 to contact an underside 516 of the tension sensor module 500, but may be biased (either due to the force of gravity when installed, and/or based upon a spring or biasing member) to a position where the hook receiver 110 does not contact the underside 516 of the tension sensor module 500. The first and second receiver sides 506, 608 may be configured to contact the underside 516 of the tension sensor module 500. Alternatively, or in addition, the receiver body 505 may be configured to contact the underside 516 of the tension sensor module 500. The hook receiver 110 may also be configured to rotate opposite the first direction 514 causing the hook receiver 110 to contact the stopper bolt 114.

In the second embodiment, the tension sensor module 500 may be configured to detect a force applied by the hook receiver 110 to the underside 516 of the tension sensor module 500. The tension sensor module 500 may be configured to determine a tension of the cargo securement strap 102 based on the force detected. The tension sensor module 500 may be configured to output a signal that is representative of magnitude of the force detected, and/or may be configured to output a signal of whether or not a force is detected, and/or a signal that is representative of a detection of a force equal to or above a given threshold force (upon proper calibration of the tension sensor module 500 with respect to the threshold force level).

The tension sensor module 500 may be configured to transmit the signal to a controller 518 in real-time. In one embodiment, the signal may be indicative of whether an instant tension of the cargo securement strap 102 is greater than or less than a predetermined threshold tension of the cargo securement strap 102. In other embodiments, the signal may be a real-time measurement of the tension in the cargo securement strap 102 (as calibrated) based upon the force sensed by the module 500. In some embodiments, the signal may be an approximate strap tension. In alternate embodiments, the signal may be an exact strap tension. The signal may include a yes/no signal. In some embodiments, the signal that is provided by the sensor 500 may be a signal that is calibrated by a controller 518 (shown schematically in FIG. 6), while in other embodiments the sensor 500 may itself calibrate the sensed force such that the sensor 500 provides an output that is the actual sensed force, or the yes/no of an force being detected, or the yes/no of a force detected above a certain force level (or may be calibrated to provide a signal of the tension of the strap or chain that is connected to the hook 106 based upon the sensed force.

During operation, due to the tension in the cargo securement strap 102, the hook 106 may be pulled into contact with the bottom side 132 of the hook receiver 110 causing the hook receiver 110 to rotate in the first direction 514 (due to a force being applied to the hook receiver 110 from the hook 106). The hook receiver 110 may rotate and/or slide with respect to the frame 108 until a portion of the hook receiver 110 contacts the underside 516 of the tension sensor module 500, and the tension sensor module 500 may detect the force applied by the hook receiver 110 to the underside 516 of the tension sensor module 500 (such as the magnitude of the force, or the existence of a force as discussed above). The tension sensor module 500 may transmit the signal representative of the force detected to the controller 518.

A releasable anchor system for securing cargo may also be provided. The system may include only the anchor device 100. Alternatively or in addition, the system may include the cargo securement strap 102, the mounting track 104, the hook 106, the crank, the tension sensor module 500, and the controller 518. The tension sensor module 500 may be positioned in the anchor device 100. The anchor device 100 may be mounted on the mounting track 104. The cargo securement strap 102 may be attached to the hook 106 at an end and the crank at an opposite end. The hook 106 may engage the anchor device 100. When the tension is added to the cargo securement strap 102, the tension sensor module 500 may be configured to output the signal to the controller 518. The signal may be representative of the force applied by the hook 106 to the tension sensor module 500.

Each component may include additional, different, or fewer components. For example, the tension sensor module 500 may include a sensor. The sensor may be any device configured to sense the applied force. In some embodiments, the sensor may be a flat disc force sensor, such as the flat disk sensor sold under the trademark FLEXIFORCE™, available from Tekscan, Inc. The tension sensor module 500 may include a circuit board. Additionally, the tension sensor module 500 may be configured to wirelessly transmit signals to a system in a driver cab of a vehicle or to a device such as a laptop, cell phone, tablet, or other system. The system may further be configured for remote connectivity to allow the system to transmit signals to a remote location, such as via an internet or cell phone or other connection.

The methods, systems, and devices described above may be implemented in many different ways and in many different combinations of hardware and software. For example, the controller 518 and/or the tension sensor module 500 may be circuitry that includes an instruction processor, such as a Central Processing Unit (CPU), microcontroller, or a microprocessor; or as an Application Specific Integrated Circuit (ASIC), Programmable Logic Device (PLD), or Field Programmable Gate Array (FPGA); or as circuitry that includes discrete logic or other circuit components, including analog circuit components, digital circuit components or both; or any combination thereof. The circuitry may include discrete interconnected hardware components or may be combined on a single integrated circuit die, distributed among multiple integrated circuit dies, or implemented in a Multiple Chip Module (MCM) of multiple integrated circuit dies in a common package, as examples.

Accordingly, the circuitry may store or access instructions for execution, or may implement its functionality in hardware alone. The instructions may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Hard Disk Drive (HDD), or other magnetic or optical disk; or in or on another machine-readable medium. A product, such as a computer program product, may include a storage medium and instructions stored in or on the medium, and the instructions when executed by the circuitry in the controller 518 and/or the tension sensor module 500 may cause the controller 518 and/or the tension sensor module 500 to implement any of the processing described above.

The implementations may be distributed. For instance, the circuitry may include multiple distinct system components, such as multiple processors and memories, and may span multiple distributed processing systems. Parameters, databases, and other data structures may be separately stored and managed, may be incorporated into a single memory or database, may be logically and physically organized in many different ways, and may be implemented in many different ways. Example implementations include linked lists, program variables, hash tables, arrays, records (e.g., database records), objects, and implicit storage mechanisms. Instructions may form parts (e.g., subroutines or other code sections) of a single program, may form multiple separate programs, may be distributed across multiple memories and processors, and may be implemented in many different ways.

To clarify the use of and to hereby provide notice to the public, the phrases "at least one of <A>, <B>, . . . and <N>" or "at least one of <A>, <B>, . . . <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed. Unless otherwise indicated or the context suggests otherwise, as used herein, "a" or "an" means "at least one" or "one or more."

While the preferred embodiments of the disclosure have been described, it should be understood that the disclosure is not so limited and modifications may be made without departing from the invention. The scope of the invention is defined by the appended claims, and all devices that come within the meaning of the claims, either literally or by equivalence, are intended to be embraced therein.

The invention claimed is:

1. A releasable anchor system for securing cargo, the anchor system comprising:
   a frame comprising a top portion, a first side, and a second side, the first and the second side extending from opposite sides of the top portion;
   a hook receiver coupled to the frame between the first side and the second side, wherein the hook receiver is configured to receive a hook of a cargo securement strap;
   a keeper configured to retain the hook when received upon the hook receiver, the keeper comprising a keeper body, a first keeper finger, and a second keeper finger, wherein the first and second keeper fingers extend from opposite sides of the keeper body, wherein the first and second keeper fingers are rotatably coupled to the first and second side, respectively; and
   a stopper bolt coupled between the first side and the second side, wherein the stopper bolt is positioned to contact the first and second keeper fingers in a first position.

2. The anchor system of claim 1, further comprising a tension sensor module coupled to the frame and configured to determine a tension of the cargo securement strap.

3. The anchor system of claim 1, wherein the hook receiver comprises a receiver body, a first receiver side, and a second receiver side.

4. The anchor system of claim 3, wherein the hook receiver further comprises a pivot pin extending between the first side and the second side and through the first receiver side and the second receiver side, wherein the pivot pin rotatably couples the first receiver side to the first side of the frame and the second receiver side to the second side of the frame.

5. The anchor system of claim 4, further comprising a tension sensor module coupled to the frame and extending between the first side of the frame and the second side of the frame, wherein, when the hook engages the hook receiver, and when tension is placed upon the hook, the hook receiver is configured to rotate in a first direction, causing the hook receiver to contact an underside of the tension sensor module.

6. The anchor system of claim 5, wherein the tension sensor module is configured to detect a force applied by the hook receiver to the tension sensor module, wherein the tension sensor module is configured to output a signal that is representative of the force detected.

7. The anchor system of claim 6, wherein the tension sensor module is configured to transmit the signal to a controller.

8. The anchor system of claim 7, wherein the signal is transmitted in real-time, wherein the signal is indicative of whether an instant tension of the cargo securement strap is greater than or less than a predetermined threshold tension of the cargo securement strap.

9. The anchor system of claim 6, wherein the tension sensor module is configured to determine a tension of the cargo securement strap based on the force detected, and wherein the signal is the tension of the cargo securement strap determined.

10. The anchor system of claim 1, wherein, in the first position, the first keeper finger and the second keeper finger contact the stopper bolt, wherein the keeper body is urged into the first position due to a force of gravity acting upon the keeper body, and wherein the force of gravity upon the keeper body urges the first and second keeper fingers to maintain contact with the stopper bolt.

11. The anchor system of claim 1, wherein, in a second position, the keeper body contacts the stopper bolt, wherein the keeper body comprises a handle portion configured to be grasped by a user to manually move the keeper between the first position and second positions.

12. The anchor system of claim 11, wherein the keeper body is entirely disposed within the frame in the first and second positions.

13. The anchor system of claim 11, wherein, in the first position, the keeper body is positioned to prevent the hook from disengaging the hook receiver, and wherein, in the second position, the keeper body is positioned to allow the hook to disengage from the hook receiver.

14. The anchor system of claim 13, wherein, when the hook is upon the hook receiver in the first position, a top surface of the keeper body faces a bottom edge of the hook preventing removal of the hook, wherein, in the second position, the top surface of the keeper body is rotated away from the bottom edge of the hook allowing removal of the hook.

15. An anchor device for a cargo securement strap comprising:
a frame configured to engage a mounting track;
a hook receiver coupled to the frame, the hook receiver configured to receive a hook of the cargo securement strap; and
a keeper coupled to the frame, the keeper comprising a keeper body and at least one keeper finger extending from a side of the keeper body, wherein the keeper is configured to move between a first position and a second position, wherein, in the first position, the at least one keeper finger contacts a bolt and the keeper body is positioned to retain the hook, and wherein, in the second position, the keeper body is positioned to allow for removal of the hook from the hook receiver.

16. The anchor device of claim 15, wherein the frame is shaped to slidably engage a Double-L shaped mounting track or a C-shaped mounting track.

17. The anchor device of claim 15, wherein the keeper is configured to move between the first position and the second position by rotating, sliding, or a combination thereof.

18. The anchor device of claim 15, wherein the keeper body is urged into the first position by gravity, and wherein a top surface of the keeper body is positioned beneath a bottom edge of the hook receiver.

19. The anchor device of claim 15, wherein the at least one keeper finger comprises two keeper fingers extending from opposite sides of the keeper body, wherein the keeper body comprises a handle portion.

20. The anchor device of claim 19, wherein the handle portion is configured to be grasped by a user to move the keeper between the first position to the second position, and wherein the handle portion extends beyond an outer edge of the frame in the first and second positions.

21. The anchor device of claim 15, wherein, when tension is placed on the hook, the anchor device is configured to prevent removal of the hook from the hook receiver in the first position and the second position.

22. A method of use for an anchor device of a cargo securement strap, the method comprising:
attaching the anchor device to a mounting track of a vehicle, the anchor device including:
a frame configured to engage the mounting track,
a hook receiver coupled to the frame, the hook receiver configured to receive a hook of the cargo securement strap; and
a keeper pivotably coupled to the frame, the keeper comprising a keeper body and two keeper fingers extending from opposite sides of the keeper body, wherein the keeper is configured to pivot between a first position and a second position, wherein, in the first position, the two keeper fingers contact a bolt and the keeper body is positioned to retain the hook, and wherein, in the second position, the keeper body contacts the bolt and the keeper is positioned to allow a release of the hook from the hook receiver by pulling the hook downwardly from the hook receiver to free an extended end of the hook from the hook receiver;
pulling a handle of the keeper body causing the keeper to rotate from the first position to the second position;
engaging the hook of the cargo securement strap with the hook receiver; and
releasing the handle causing the keeper to rotate from the second position to the first position due to a force of gravity acting upon the keeper body.

23. The method of claim 22, further comprising pulling the handle of the keeper body causing the keeper to rotate from the first position to the second position and disengaging the hook from the hook receiver by pulling the hook downwardly with respect to the hook receiver until the extended end of the hook extends below the hook receiver.

24. The method of claim 22, further comprising detecting a force applied to a tension sensor module, wherein the tension sensor module is coupled to the frame, wherein, when the hook engages the hook receiver and a tension is applied to the hook, the hook receiver is configured to rotate, causing the hook receiver to contact an underside of the tension sensor module, wherein the tension sensor module is configured to detect the force applied by the hook receiver to the underside of the tension sensor module.

25. The method of claim 24, wherein the tension sensor module is configured to determine the tension of the cargo securement strap based on the force.

26. The method of claim 24, further comprising transmitting a signal to a controller in real-time based on the force detected, wherein the signal is indicative of whether an instant tension of the cargo securement strap is greater than or less than a predetermined threshold tension of the cargo securement strap.

* * * * *